June 28, 1960 H. TÖPFER ET AL 2,943,153
CIRCUIT ARRANGEMENT FOR SIGNALLING
SWITCHES OF THE RELAY TYPE
Filed Feb. 10, 1958 2 Sheets-Sheet 1

Inventors.
Herbert Töpfer,
Hans-Joachim Lurk, &
Walter Villmann.
By [signature] Atty.

Inventors.
Herbert Töpfer,
Hans-Joachim Turk, &
Walter Villmann.
By. [signature] Att'y.

United States Patent Office 2,943,153

Patented June 28, 1960

2,943,153

CIRCUIT ARRANGEMENT FOR SIGNALLING SWITCHES OF THE RELAY TYPE

Herbert Töpfer, Hans-Joachim Lurk, and Walter Villmann, Munich, Germany, assignors to Siemens & Halske Aktiengesellschaft, Berlin and Munich, a corporation of Germany Filed Feb. 10, 1958, Ser. No. 714,367

Claims priority, application Germany Feb. 22, 1957

10 Claims. (Cl. 179—18)

This invention is concerned with a circuit arrangement for relay switches for communication systems, especially telephone systems, comprising a number of coupling relays corresponding in number to the number of available outgoing lines or trunks.

In known relay switches, the coupling relays are equipped with an energizing winding and in addition thereto with a holding winding connected in the seizure circuit extending to a succeeding selection stage. In order to eliminate a second winding, it has been proposed to extend the energizing circuit by way of a high resistance resistor in circuit with the winding controlled over the seizure or private conductor. After energization of the coupling relay, such relay will be held actuated over this winding and the high resistance resistor will be shunted.

The present invention proposes another way for the elimination of a second winding in connection with coupling relays, namely, provision of means for causing a coupling relay, allotted to an idle outgoing line or trunk, to close a holding circuit over its energizing or operating winding incident to connection with an idle line or trunk to be taken into use.

The arrangement according to the invention, as compared with prior arrangements, presents an advantage for relay switches in which a private conductor is connected through over several selection stages, in placing in the private conductor instead of a winding of the coupling relay, which would change the potential conditions for the blocking or busy potential very considerably, merely a low resistance holding winding of a seizure relay.

In relay switches in which the private conductors extend only from a preceding to a next successive stage, the invention provides the advantage that the potential effecting the seizure, for example, positive potential, can be connected to the private conductor without interposition of a relay winding, so that the seizure relay of the next successive stage can energize without delay and thus effect immediate busying of the corresponding line or trunk.

The various objects and features of the invention will appear from the description which will be rendered below with reference to the accompanying drawings, showing in schematic manner only the switching details of three embodiments which are required for the understanding of the invention.

Figure 1:
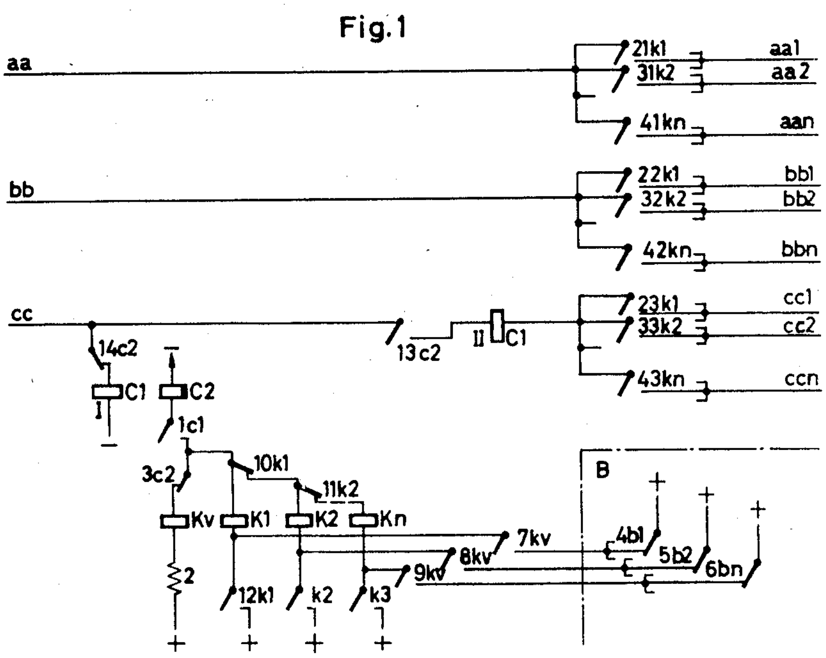
Fig. 1 shows parts of a relay switch with a seizure or private conductor which is switched through over several selection stages.

The relay switch illustrated in Fig. 1 is seized over a preceding selection stage by way of the private conductor *cc*. The seizure or private relay C1 energizes and closes at its contact **1*c*1** a circuit for coupling-preparatory relay or control relay K*v*, namely (1) from +, thermistor 2, control relay K*v*, **3*c*2, 1*c*1**, auxiliary seizure relay C2 to —

The resistance of the thermistor 2 which drops with rising temperature is initially of a magnitude such that control relay K*v* operates without delay while relay C2 operates with a delay. The coupling relays K of all available lines or trunks are switched in upon actuation of relay K*v*. For example, if all trunks to which the switch has access are idle, contacts **4*b*1 to 6*bn***, controlled by a device B which marks the conditions of the trunks, will be closed, and circuits will be completed for the coupling relays K, namely $$(2)\quad \text{from}+,\ \frac{\dfrac{4b1,\ 7kv,\ K1}{5b2,\ 8kv,\ K2,\ 10k1}}{6bn,\ 9kv,\ Kn,\ \ldots\ 11k2},\ 1c1,\ C2,\ -$$

Relay K1, upon operating in the above traced circuit, opens its contact **10*k*1, thereby disconnecting all other coupling relays, and closes at its contact 12*k*1 a holding circuit for itself, namely (3) from +, 12*k*1, K1, 1*c*1**, C2 to —

Auxiliary seizure or private relay C2 also energizes in the circuit (2), closing its contact **13*c*2** and thus switching the private conductor *cc* through to the next selection stage, by way of contact **23*k*1 (coupling relay K1 being operated), and opening its contact 14*c*2**, thereby disconnecting winding I of private relay C1. Relay C1 remains operated over its low resistance winding II disposed in the private conductor *cc* which has been switched through to the private conductor *cc*1.

In case all outgoing trunks are busy, auxiliary seizure relay C2 energizes with delay (see circuit 1), and disconnects at its contact **14*c*2 the operating winding I of relay C1. The latter relay cannot remain operated over its holding winding II since none of the contacts 23*k*1 to 43*kn* is in closed position. Release of relay C1 causes opening of contact 1*c*1**, thereby effecting restoration of relay C2.

Figure 2:
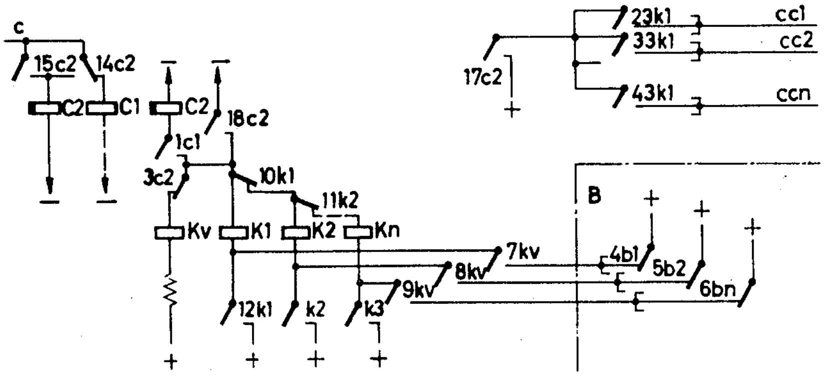
Fig. 2 shows parts of a relay switch in which the private conductor extends only from one to the next successive selection stage.

The operation of the relay switch according to Fig. 2 is similar to that shown in Fig. 1. Upon actuation of relay C2, contact **14*c*2 will be opened to disconnect relay C1 and contact 15*c*2 will be closed to complete a circuit for the holding winding II of relay C2. At contact 18*c*2, a holding circuit is closed for the coupling relay that may have been actuated, and at contact 17*c*2**, positive potential is connected to the private conductor extending to the next selection stage, for example, private conductor *cc*1.

Figure 3:
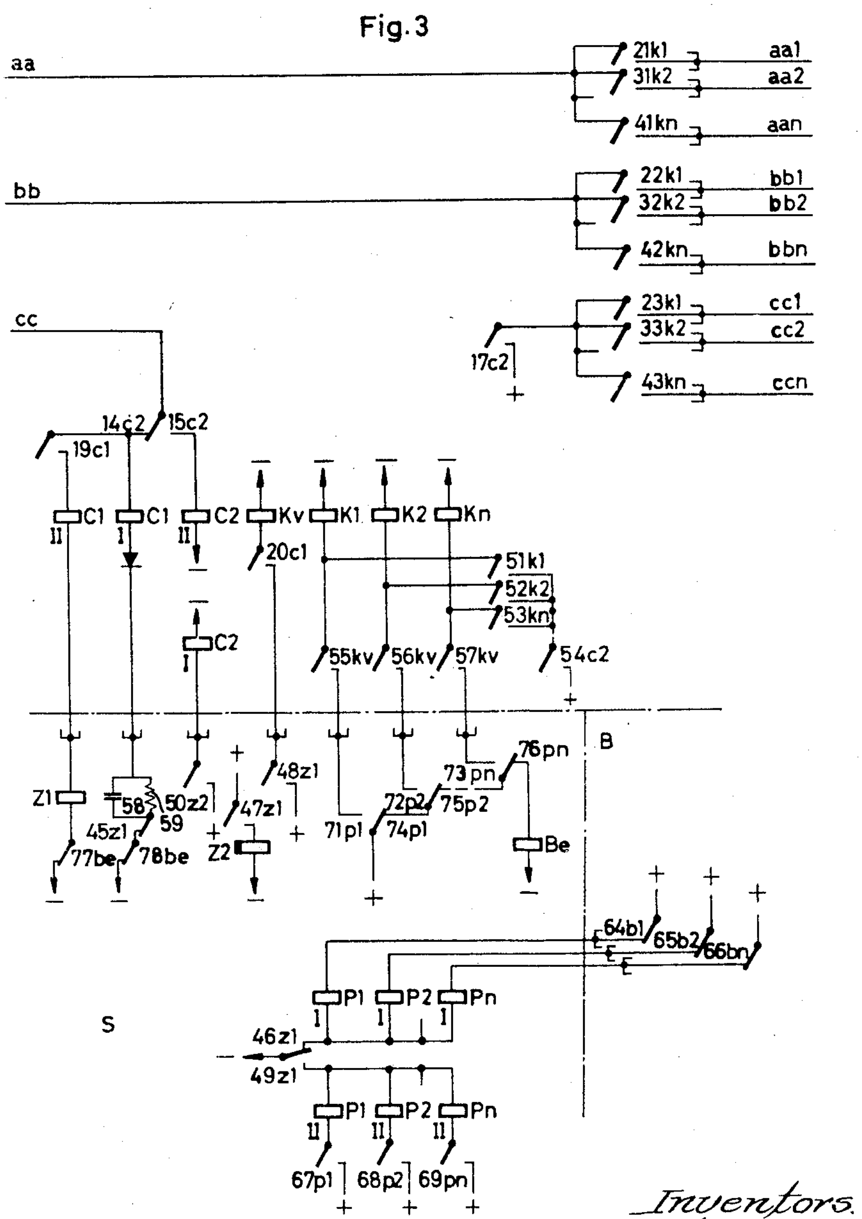
Fig. 3 shows parts of a relay switch corresponding to the one shown in Fig. 2, but the setting of which is controlled by a control device which is common to several relay switches.

In the embodiment according to Fig. 3, there is provided a control device S which is common to a plurality of relay switches. This control device is seized by way of the test multiple. Provision of the common control device makes it possible to render the switch structure particularly simple. The seizure or private relay of the relay switch serves as a test relay for the test multiple. The private relay C1 can upon seizure of the relay switch operate only if the control device S is at such instant idle. The capacitor 58 disposed in the test multiple leading to the control device S is dimensioned so that none of two simultaneously testing relay switches can connect with the test device while in the case of relay switches testing in quick succession, the first one will connect with and seize the control device for service.

Seizure of the control device is also prevented in case all outgoing lines or trunks should be busy. In such case, the marker contacts **64*b*1, 65*b*2, 66*bn*** of the marker device B will be open and relays P1 to P*n* will be at normal. Serially related contacts of these relays will close a circuit for the busy relay B*e* of the control device S, namely (4) from +, 74*p*1, 75*p*2, 76*pn*, B*e* to −

Relay B*e*, upon actuating, opens its contacts 77*be* and 78*be*, thus preventing seizure of the control device S by a relay switch.

If an outgoing line or trunk to which a relay switch has access, is idle, contacts 77*be* and 78*be* will be closed. Upon testing of the relay switch, Fig. 3, for seizure of the control device, incident to the seizure of such switch over the private conductor *cc*, relay C1 will be actuated over its winding I and will close its contact 19*c*1 to complete a circuit for its holding winding II extending by way of relay Z1 in the control device S, such relay Z1 being common to the test multiple. Relay Z1 opens its contacts 45*z*1, 46*z*1 and closes its contacts 47*z*1 to 49*z*1.

At contact 45*z*1, the test circuit of the test multiple is interrupted. The capacitor 58 which had been charged in the testing circuit over the energizing winding I of relay C1, discharges over resistor 59, thus being prepared for subsequent operation. At contact 47*c*1, a circuit is closed for slow-to-operate relay Z2, and at contact 48*z*1, a circuit is closed for coupling-preparing relay or control K*v* of the relay switch, namely (5) from +, 47*z*1, Z2 to − and (6) from +, 48*z*1, 20*c*1, K*v* to −

At contact 49*z*1, holding circuits are closed for relays P, over holding windings II thereof, such relays, as explained before, marking the condition of the outgoing lines. For example, if the line to which relay P1 is allotted, is idle, and if the lines to which relays P2 to P*n* are allotted, are busy, only relay P1 will be energized. This relay will remain operated in a holding circuit over its winding II, extending by way of contact 49*z*1, namely (7) from +, 67*p*1, IIP1, 49*z*1 to −

When the lines or trunks to which the marker relays P2 to P*n* are allotted become idle, these relays can not become operated because contact 46*z*1 is open. Accordingly, during the through connection will continue the marking condition that prevailed upon seizure of the common device S will continue for the duration of the interval required for extending the connection through to the succeeding stage. Double connections are in this manner prevented.

Relay P1 being actuated and contact 71*p*1 being closed, a circuit for coupling relay K1 will become effective upon actuation of relay K*v*, namely (8) from +, 71*p*1, 55*kv*, K1 to −

Responsive to actuation of relay Z2 in the circuit (5), a circuit will be closed at contact 50*z*2 for winding I of the auxiliary private relay C2, namely (9) from +, 50*z*2, IC2 to −

The auxiliary private relay C2 opens its contact 14*c*2 and closes its contacts 15*c*2, 17*c*2 and 54*c*2. At contact 14*c*2, the private or testing circuit to the control device S is interrupted and at contact 15*c*2 is closed a circuit for the holding winding II of relay C2. At contact 54*c*2 is closed a holding circuit for coupling relay K1, namely

(10) from +, 54*c*2, 51*k*1, K1 to −

As in the example according to Fig. 2, positive potential is connected at contact 17*c*2 to the private conductor extending to the next successive selection stage, thus effecting seizure thereof without any delay Restoration of relay C1, responsive to opening of contact 14*c*2, causes opening of contact 19*c*1 and consequently restoration of relays Z1 and Z2 of the control device S, placing such device again in readiness for effecting switching operations in connection with a subsequently seized relay switch.

Changes may be made within the scope and spirit of the appended claims which define what is believed to be new and desired to have protected by Letters Patent.

We claim:

1. In a relay switch for a signalling system having a plurality of coupling relays corresponding in number to the number of outgoing lines accessible to the switch and respectively allotted to said lines, a circuit arrangement for controlling the actuation of said coupling relays, said circuit arrangement comprising circuit means for effecting, responsive to seizure of the relay switch, energization of an operating winding of a coupling relay allotted to an idle outgoing line, to cause operative actuation of said coupling relay, and circuit means controlled by said coupling relay upon operative actuation thereof for connecting said operating winding in a local holding circuit.

2. A circuit arrangement according to claim 1, comprising a private relay which is actuated responsive to seizure of said relay switch, circuit means controlled by said private relay for connecting said coupling relay for operation and for preparing the holding circuit therefor, a control relay, and means controlled by said control relay after operative actuation of said coupling relay for disconnecting the energizing circuit of said coupling relay.

3. A circuit arrangement according to claim 2, comprising means controlled by said private relay for governing the operative actuation of said control relay, an auxiliary private relay operatively responsive upon actuation of at least one of said coupling relays, and means controlled by said auxiliary private relay upon actuation thereof for disconnecting said control relay.

4. A circuit arrangement according to claim 3, comprising chain contact means for securing in the presence of a plurality of idle lines the operative actuation of only one coupling relay.

5. A circuit arrangement according to claim 2, comprising marker relay means for marking the availability of outgoing lines, and circuit means controlled by said private relay for causing energization of a coupling relay allotted to an outgoing line marked as idle by said relay means.

6. A circuit arrangement according to claim 2, comprising a control device common to a plurality of relay switches, test multiple circuit means extending from said control device to said relay switches, the respective private relays of said relay switches being connected with said test multiple and serving as test relays with respect thereto, and means for preventing simultaneous seizure of said control device by more than one of said relay switches.

7. A circuit arrangement according to claim 5, comprising an auxiliary relay included in said control device, and circuit means governed by said auxiliary relay for maintaining said marker relays for the duration of the coupling operation of said relay switch in the operating condition in which such marker relays were upon initiation of said coupling operation.

8. A circuit arrangement according to claim 6, comprising relay means for marking the availability of outgoing lines, circuit means controlled by said private relay for causing energization of a coupling relay allotted to an outgoing line marked as idle by said relay means, an auxiliary relay included in said control device, and circuit means governed by said auxiliary relay for controlling the operative actuation of said marker relays.

9. A circuit arrangement according to claim 7, wherein said marker relays are in actuated condition when the corresponding lines are idle, and means governed by said auxiliary relay for connecting holding windings of said marker relays so as to maintain the respective actuated marker relays in actuated position for the duration of the coupling operation.

10. A circuit arrangement according to claim 8, wherein said marker relays are in actuated condition when the corresponding lines are idle, and means governed by said auxiliary relay for connecting holding windings of said marker relays so as to maintain the respective actuated marker relays in actuated position for the duration of the coupling operation.

References Cited in the file of this patent

UNITED STATES PATENTS 2,792,453 Spiecker ---------------- May 14, 1957
2,846,510 Spiecker et al. ------------ Aug. 5, 1958